Figure 1:
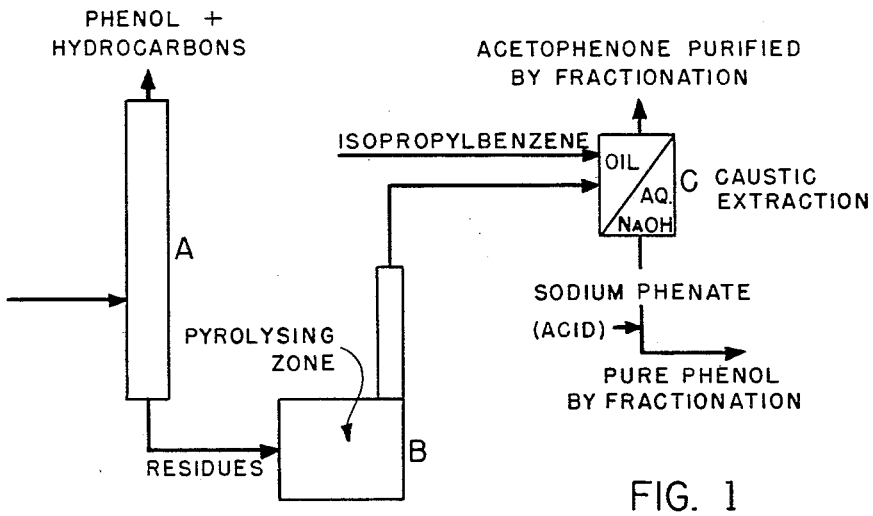

Dec. 13, 1955  T. BEWLEY  2,727,074

MANUFACTURE OF PHENOL

Filed Aug. 28, 1952

THOMAS BEWLEY
INVENTOR.

BY Ernest G. Peterson

AGENT.

United States Patent Office 2,727,074
Patented Dec. 13, 1955

2,727,074
MANUFACTURE OF PHENOL

Thomas Bewley, Epsom, England, assignor, by mesne assignments, to Hercules Powder Company, a corporation of Delaware Application August 28, 1952, Serial No. 306,825

Claims priority, application Great Britain September 1, 1951

9 Claims. (Cl. 260—621)

The present invention relates to a step in the manufacture of phenol by the decomposition of isopropylbenzene hydroperoxide and refers in particular to the separation of phenol from acetophenone and the ultimate recovery of substantially pure phenol and of substantially pure acetophenone.

When isopropylbenzene peroxide, which term includes isopropylbenzene hydroperoxide, is decomposed by means of suitable catalysts such as acids, hydrogen ion exchange materials, acid acting catalysts such as aluminium chloride or iron chloride or acid-treated earths it has been found that the reaction mixture resulting from the decomposition step contains besides phenol and acetone as main products small amounts of acetophenone and methylstyrene. The acetophenone causes difficulties in the separation and the isolation of the phenol by distillation because during distillation after a major part of the phenol has been distilled over the latter forms with acetophenone an azeotropic mixture. Attempts to extract the phenol from the residue thus obtained by means of concentrated aqueous alkali solution have failed because the extraction mixture divides into two layers, of which the upper layer contains a proportion of the acetophenone with scarcely any phenol as sodium phenate while the lower layer contains a larger proportion of acetophenone with most of the phenol as sodium phenate. The separation into the two phases moreover, is slow and not very definite.

It has now been found that by the use of an aqueous sodium hydroxide solution containing less than 15 grams of sodium hydroxide in 100 cc. an almost complete separation of the acetophenone from the phenol solution can be achieved. A preferred concentration of sodium hydroxide in water is from about 10 to 5 grams in 100 cc. of water. As lower limit, a concentration of 5 grams in 100 cc. water is preferred in order to keep the bulk of the resulting sodium phenate solution within limits which can be easily manipulated. A small proportion of a hydrocarbon may be added to the extraction mixture in order to facilitate the partition of the two phases. Suitable hydrocarbons are those which may be easily separated from acetophenone, for instance, by distillation. Such hydrocarbons are for instance benzene, toluene and preferably, isopropylbenzene. The amount of hydrocarbon to be added to the extraction mixture varies with the nature of the hydrocarbon. With isopropylbenzene an amount of about 20% was found to be suitable. The oily hydrocarbon phase contains the major part of acetophenone which may be recovered therefrom by distillation, which leaves as residue the small quantity of phenol in the form of sodium phenate which had been retained with the acetophenone in the oily phase. On the other hand, it has been found that when aqueous sodium hydroxide solutions of greater concentration were used for the extraction the separation of the phenol from the acetophenone was far less effective than with concentrations of less than 15% by weight, as can be seen from the following table:

| Grams NaOH in 100 cc. solution | Oil Phase | | Aqueous Phase | |
|---|---|---|---|---|
| | Percent of total acetophenone | Percent of total phenol | Percent of acetophenone | Percent of phenol |
| 25 | 70 | 0 | 30 | 100 |
| 20 | 88.2 | 0.45 | 11.8 | 99.5 |
| 15 | 89.5 | 1.5 | 10.3 | 98. |
| 10 | 97.5 | 5.4 | 2.5 | 94.6 |
| 5 | 97.7 | 4.4 | 2.3 | 95.6 |

A convenient way of recovering the reaction products derived from the decomposition of isopropylbenzene peroxide therefore comprises subjecting the reaction mixture to distillation by which at first acetone distils over. When the distillation is continued, if desired under diminished pressure, any unreacted isopropylbenzene present in the reaction mixture is distilled off together with water, and then methylstyrene. Phenol and acetophenone together with byproducts of the reaction and some resinous matter formed by polymerisation of methylstyrene remain in the still. On continuing the distillation the greater part of the phenol distils over until about 90 to 95% of the total phenol has been removed. The next fraction consists of an azeotropic mixture of phenol and acetophenone. This mixture is then extracted by means of an aqueous sodium hydroxide solution containing about 10 grams of sodium hydroxide in 100 cc. To the mixture an amount of hydrocarbon such as isopropylbenzene is added which is approximately equal to the amount of phenol contained in the mixture. The mixture separates readily into two phases, the upper phase comprising the greater part of the acetophenone and the hydrocarbon and also a small amount of phenol as sodium phenate, and the lower phase comprising the phenol to which only a small proportion of acetophenone is admixed. By distilling the upper phase the acetophenone is separated from the isopropylbenzene and the sodium phenate and can thus be recovered in a practically pure state. From the lower aqueous solution the phenol containing only a small amount of acetophenone is obtained by acidification, for instance with carbon dioxide. By suitable fractionation, for instance in the presence of water, the major part of the phenol is recovered in a practically pure state. A portion or the whole of the sodium phenate solution may be used for the neutralisation of the decomposition reaction mixture when acidic catalysts such as sulphuric acid have been used as agent for the decomposition of the isopropylbenzene hydroperoxide.

As an alternative to subjecting the azetotropic distillate comprising phenol and acetophenone to the extraction with aqueous sodium hydroxide, acetone, methylstyrene and any isopropylbenzene are removed from the reaction mixture by distillation and the resulting still residue containing all the phenol with the acetophenone and the byproducts of the reaction such as phenyldimethylcarbinol and p-cumyl phenol is extracted with the aqueous sodium hydroxide solution in accordance with the invention. The two phases, the partition of which may be promoted by the suitable addition of a hydrocarbon, may then be separated and treated for the recovery of phenol and acetophenone respectively as described above.

Another way of carrying out the process of the invention consists in a combination of the two methods described above and comprises subjecting the still residue after acetone, any isopropylbenzene present, methylstyrene and the greater part of the phenol have been distilled off, to extraction by means of aqueous sodium hydroxide solution according to the process of the invention.

Figure 2:
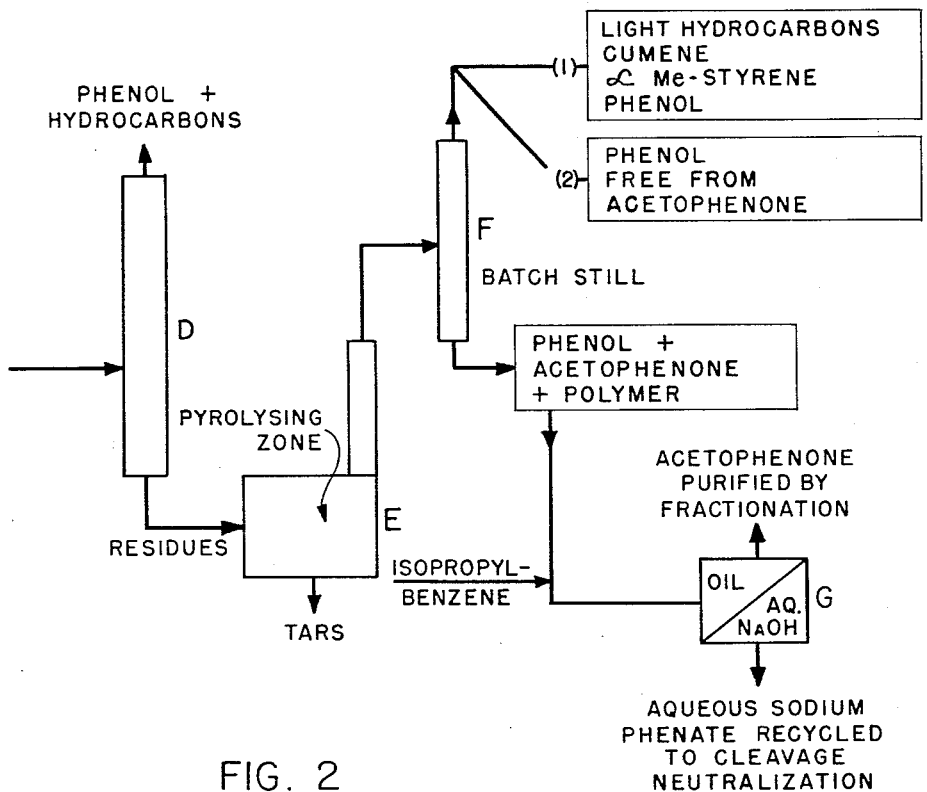

Further convenient ways of effecting the process of the invention are illustrated in the accompanying diagrammatic drawings, in which Figure 1 refers to Example 3 and Figure 2 refers to Example 4. They comprise removing from the decomposition mixture the acetone, methylstyrene, any isopropylbenzene present as described above subjecting the residue which may still contain all the phenol produced by the catalytic decomposition of isopropylbenzene hydroperoxide, or only a part of it after having distilled off a major part, to pyrolysing heat treatment at temperatures such as 300–400° C. which will decompose the phenyl dimethylcarbinol and cumyl phenol also present to methylstyrene, isopropylbenzene and phenol, but will not affect the acetophenone, and subjecting the resulting mixture to the extraction process of the invention with aqueous sodium hydroxide solution. It is preferred, however, to subject the mixture resulting from the heat treatment, and prior to the extraction with aqueous alkali, to distillation to remove the methylstyrene and isopropylbenzene formed by the decomposition as well as the greater part of the phenl, and subsequently extract the residue containing phenol, acetophenone and some polymerisation products with the aqueous alkali.

The following examples illustrate the process of the present invention when carried out in practice. The parts indicated are, if not stated otherwise, parts by weight.

*Example 1*

Isopropylbenzene hydroperoxide was decomposed at 75° C. under anhydrous conditions in the presence of acetone containing sulphuric acid, the acid amounting to 0.2% by weight of the reaction mixture. The resulting decomposition product was washed free of acid and subjected to fractional distillation whereby first acetone, then methylstyrene and subsequently 90% of the phenol contained therein were distilled off. The residue which contained 3 parts by weight of acetophenone and 1 part by weight of phenol besides some byproducts with higher boiling points was extracted with an aqueous caustic soda solution containing 10 grams of sodium hydroxide in 100 cc. The alkaline solution was used in an excess of about 3% of caustic soda. After having added 16 parts by volume of isopropylbenzene, the mixture separated readily into two phases of which the oily top phase contained 97.5% of the total acetophenone and 5.4% of the total phenol in the form of sodium phenate, and the lower aqueous phase 2.5% of the total acetophenone and 94.6% of the phenol. The oily top phase was fractionally distilled and furnished first isopropylbenzene and then pure acetophenone whilst the sodium phenate remained behind.

*Example 2*

To a mixture of 60 parts by weight of acetophenone and 20 parts by weight of phenol obtained as described in Example 1 was added 16 parts by volume of isopropylbenzene. This mixture was extracted with an aqueous sodium hydroxide solution containing 5 grams of NaOH in 100 cc. The upper oily phase contained besides the isopropylbenzene, 97.7% of the total acetophenone and 4.4% of the total phenol as sodium phenate, while the lower aqueous phase contained 2.3% of the total acetophenone and 95.6% of the total phenol. The acetophenone was recovered from the oily phase by distillation and the phenol from the aqueous phase by treatment with acid.

*Example 3*

This procedure is shown diagrammatically in Figure 1. A mixture resulting from the catalytic decomposition of isopropylbenzene hydroperoxide was introduced into distillation column A and freed from acetone, methylstyrene and phenol as shown in Example 1. It furnished 330 parts by weight of residue which contained 128 parts of phenol, 60 parts of acetophenone, 37 parts of phenyldimethyl carbinol, 54 parts of higher phenols (mainly p-cumylphenol) and 51 parts of higher boiling compounds. This mixture was passed through a pyrolysing zone B maintained at about 350° C. The issuing product contained 150 parts of phenol, 60 parts of acetophenone, 45 parts of alpha-methylstyrene, 10 parts of light hydrocarbons including isopropylbenzene, 8 parts of water and 5 parts of alpha-methylstyrene polymer.

This product was extracted in extractor C with 734 parts of a 10% aqueous sodium hydroxide solution. To this mixture was added some isopropylbenzene and then allowed to stand and separate into two layers.

The upper layer comprising acetophenone to an extent of 97% of the total acetophenone content, and isopropylbenzene was fractionally distilled and furnished 53.2 parts of substantially pure acetophenone. 5 parts of acetophenone had distilled over with the isopropylbenzene and this mixture was recycled to an appropriate point in the recovery system.

The aqueous phase contained 175 parts of sodium phenate which on acidification with sulphuric acid yielded 141.8 parts of phenol which on subsequent distillation in the presence of water furnished phenol in a state of high purity.

*Example 4*

This example is illustrated by the diagrammatic Figure 2. The mixture was distilled in column D and the residue passed through a pyrolysing zone E as described in Example 3. The product issuing from the zone was fractionated in a column F through which 55 parts of light hydrocarbons, isopropylbenzene and alpha-methyl styrene, further 8 parts of water and 2 parts of phenol were removed as a first fraction, followed by 130 parts of pure phenol. From the base of the still a mixture containing 18 parts of phenol and 60 parts of acetophenone together with 5 parts of alpha-methylstyrene polymer was obtained. This mixture was diluted with 15 parts of isopropylbenzene and then extracted with 88 parts of aqueous sodium hydroxide solution containing 10 grams NaOH in 100 cc. in extractor G. The extraction mixture separated on standing into two phases. The upper phase containing 58 parts of acetophenone was fractionally distilled in a batch still and yielded 55 parts of substantially pure acetophenone. Sodium phenate together with 3 parts of acetophenone was left as residue.

The aqueous phase which contained 21 parts of sodium phenate and 2 parts of acetophenone was combined with the residue left by the acetophenone distillation and the mixture returned to the system and used for the neutralisation of the acid decomposition product resulting from the cleavage of isopropylbenzene hydroperoxide. In this manner the remainder of the phenol was ultimately recovered.

I claim:

1. In the process for the manufacture of phenol by the catalytic decomposition of isopropylbenzene hydroperoxide the step of separating phenol from acetophenone which comprises extracting a mixture containing phenol and acetophenone with an aqueous sodium hydroxide solution which contains less than 15 grams sodium hydroxide in 100 cc., thereby forming an aqueous alkaline phase containing sodium phenate and a residual phase containing acetophenone, separating the aqueous phase and recovering phenol from the sodium phenate in solution in the aqueous phase by treatment with acid, and recovering substantially pure acetophenone from the residual phase by distillation.

2. Process as claimed in claim 1, wherein the aqueous sodium hydroxide solution contains 5 to 10 grams NaOH in 100 cc.

3. Process as claimed in claim 1, wherein the partition of the aqueous alkaline phase from the remainder of the mixture is facilitated by the addition to the extraction mixture of a hydrocarbon which is readily separable from acetophenone.

4. Process as claimed in claim 3 wherein the hydrocarbon is isopropylbenzene.

5. In the process for the manufacture of phenol by the catalytic decomposition of isopropylbenzene hydroperoxide the recovery of the reaction products which comprises removing from the decomposition reaction mixture acetone, any isopropylbenzene present, methylstyrene, and the greater part of the phenol content, distilling from the remaining mixture phenol and acetophenone as an azeotropic mixture, extracting the azeotropic mixture with aqueous sodium hydroxide solution containing less than 15 grams sodium hydroxide in 100 cc. thereby forming an aqueous alkaline phase containing sodium phenate and a residual phase containing acetophenone, and recovering phenol from the sodium phenate in solution in the aqueous phase and recovering acetophenone from the residual phase.

6. In the process for the manufacture of phenol by the catalytic decomposition of isopropylbenzene hydroperoxide the recovery of the reaction products which comprises removing from the decomposition reaction mixture acetone, any isopropylbenzene present, and methylstyrene, subjecting the remaining mixture to a pyrolysing heat treatment, extracting the mixture issuing from the pyrolysing zone with aqueous sodium hydroxide solution containing less than 15 grams sodium hydroxide in 100 cc. thereby forming an aqueous alkaline phase containing sodium phenate and a residual phase containing acetophenone, and recovering phenol from the sodium phenate in solution in the aqueous phase and recovering acetophenone from the residual phase.

7. A process as claimed in claim 6 wherein part of the phenol is removed from the mixture prior to the pyrolysing heat treatment.

8. In the process for the manufacture of phenol by the catalytic decomposition of isopropylbenzene hydroperoxide the recovery of the reaction products which comprises removing from the decomposition reaction mixture acetone, methylstyrene, and any isopropylbenzene present, subjecting the remaining mixture to a pyrolysing heat treatment, distilling methylstyrene, and isopropylbenzene resulting from said heat treatment and phenol from the product issuing from the pyrolysing zone, extracting the remaining mixture of phenol and acetophenone with aqueous sodium hydroxide solution containing less than 15 grams of sodium hydroxide in 100 cc. thereby forming an aqueous alkaline phase containing sodium phenate and a residual phase containing acetophenone, and recovering phenol from the sodium phenate in solution in the aqueous phase and recovering acetophenone from the residual phase.

9. In the process for the manufacture of phenol by the catalytic decomposition of isopropylbenzene hydroperoxide the recovery of the reaction products which comprises removing from the decomposition reaction mixture acetone, methylstyrene, any isopropylbenzene present and phenol, subjecting the remaining mixture to a pyrolysing heat treatment, distilling methylstyrene, isopropylbenzene and phenol resulting from said heat treatment from the product issuing from the pyrolysing zone, extracting the remaining mixture of phenol and acetophenone with aqueous sodium hydroxide solution containing less than 15 grams of sodium hydroxide in 100 cc. thereby forming an aqueous alkaline phase containing sodium phenate and a residual phase containing acetophenone, and recovering phenol from the sodium phenate in solution in the aqueous phase and recovering acetophenone from the residual phase.

References Cited in the file of this patent

UNITED STATES PATENTS 2,597,497   Joris _____ May 20, 1952

FOREIGN PATENTS 670,444   Great Britain _____ Apr. 16, 1952